(12) United States Patent
Chiyo

(10) Patent No.: US 9,793,718 B2
(45) Date of Patent: Oct. 17, 2017

(54) COIL UNIT HAVING PLURAL COILS FOR WIRELESS POWER TRANSMISSION

(71) Applicant: TDK CORPORATION, Tokyo (JP)

(72) Inventor: Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 461 days.

(21) Appl. No.: 14/548,854

(22) Filed: Nov. 20, 2014

(65) Prior Publication Data

US 2015/0145340 A1    May 28, 2015

(30) Foreign Application Priority Data

Nov. 28, 2013    (JP) .................................. 2013-246450

(51) Int. Cl.
| | | |
|---|---|---|
| H02J 5/00 | (2016.01) | |
| H04B 5/00 | (2006.01) | |
| H01F 27/38 | (2006.01) | |
| H01F 38/14 | (2006.01) | |
| H01F 3/10 | (2006.01) | |

(52) U.S. Cl.
CPC .............. *H02J 5/005* (2013.01); *H01F 27/38* (2013.01); *H01F 38/14* (2013.01); *H04B 5/00* (2013.01); *H01F 3/10* (2013.01)

(58) Field of Classification Search
CPC ....................................................... H04B 5/00
USPC ....................................................... 307/104
See application file for complete search history.

(56) References Cited

U.S. PATENT DOCUMENTS

| | | |
|---|---|---|
| 4,873,677 A | 10/1989 | Sakamoto et al. |
| 8,422,973 B2 | 4/2013 | Takarada |
| 8,508,184 B2 | 8/2013 | Sakakibara et al. |
| 9,318,258 B2 | 4/2016 | Yamakawa et al. |
| 9,728,325 B2 * | 8/2017 | Chiyo ................... H01F 27/346 |
| 2002/0079863 A1 | 6/2002 | Abe et al. |
| 2012/0074899 A1 | 3/2012 | Tsai et al. |
| 2012/0119698 A1 | 5/2012 | Karalis et al. |
| 2013/0093252 A1 | 4/2013 | Norconk et al. |
| 2013/0093253 A1 | 4/2013 | Norconk et al. |
| 2013/0147283 A1 | 6/2013 | Kawano et al. |
| 2014/0084697 A1 | 3/2014 | Yasuda et al. |

(Continued)

FOREIGN PATENT DOCUMENTS

| | | |
|---|---|---|
| JP | S64-23730 A | 1/1989 |
| JP | H06-225482 A | 8/1994 |

(Continued)

OTHER PUBLICATIONS

Jul. 18, 2016 Office Action issued in Chinese Application No. 201410714380.5.

(Continued)

*Primary Examiner* — Adi Amrany
(74) *Attorney, Agent, or Firm* — Oliff PLC

(57) ABSTRACT

A coil unit includes first and second coils that are apposed, and third and fourth coils located on the rear side of the first and second coils so as to interpose the center of the first coil and the center of the second coil between the third and fourth coils, in the direction of alignment of the first and second coils. The axial direction of the third and fourth coils is substantially perpendicular to the axial direction of the first and second coils. First to fourth drive control units control the directions or phases of the currents to be supplied to the first to fourth coils, respectively.

4 Claims, 9 Drawing Sheets

(56) References Cited

U.S. PATENT DOCUMENTS

| | | | | |
|---|---|---|---|---|
| 2015/0145339 A1* | 5/2015 | Chiyo | ............... | B60L 11/00 307/104 |
| 2015/0145341 A1* | 5/2015 | Chiyo | ............... | H01F 27/38 307/104 |
| 2015/0145342 A1* | 5/2015 | Chiyo | ............... | H01F 27/38 307/104 |
| 2015/0145343 A1* | 5/2015 | Chiyo | ............... | H01F 27/38 307/104 |

FOREIGN PATENT DOCUMENTS

| | | |
|---|---|---|
| JP | H07-231586 A | 8/1995 |
| JP | H08-223094 A | 8/1996 |
| JP | H09-65502 A | 3/1997 |
| JP | H09-74034 A | 3/1997 |
| JP | H09-283346 A | 10/1997 |
| JP | 2002-199598 A | 7/2002 |
| JP | 2010-172084 A | 8/2010 |
| JP | 2011-234496 A | 11/2011 |
| JP | 2012-151311 A | 8/2012 |
| JP | 2012-175806 A | 9/2012 |
| JP | 2013-039027 A | 2/2013 |
| JP | 5253607 B1 | 7/2013 |
| JP | 2013-207727 A | 10/2013 |
| JP | 2013-208012 A | 10/2013 |
| WO | 2012/029179 A1 | 3/2012 |
| WO | 2013/172336 A1 | 11/2013 |
| WO | 2014/119296 A1 | 8/2014 |

OTHER PUBLICATIONS

May 30, 2016 Office Action issued in Chinese Application No. 201410707722.0.
Jan. 9, 2017 Office Action issued in Chinese Application No. 201410707722.0.
Jul. 1, 2016 Office Action Issued in U.S. Appl. No. 14/548,420.
Jul. 5, 2016 Office Action Issued in U.S. Appl. No. 14/549,118.
Jul. 28, 2016 Office Action Issued in U.S. Appl. No. 14/548,950.
May 19, 2015 Extended Search Report issued in European Patent Application No. 14194982.6.
Jun. 1, 2015 Extended Search Report issued in European Patent Application No. 14194935.4.
Mar. 22, 2017 Second Office Action issued in Chinese Application No. 201410714380.

* cited by examiner

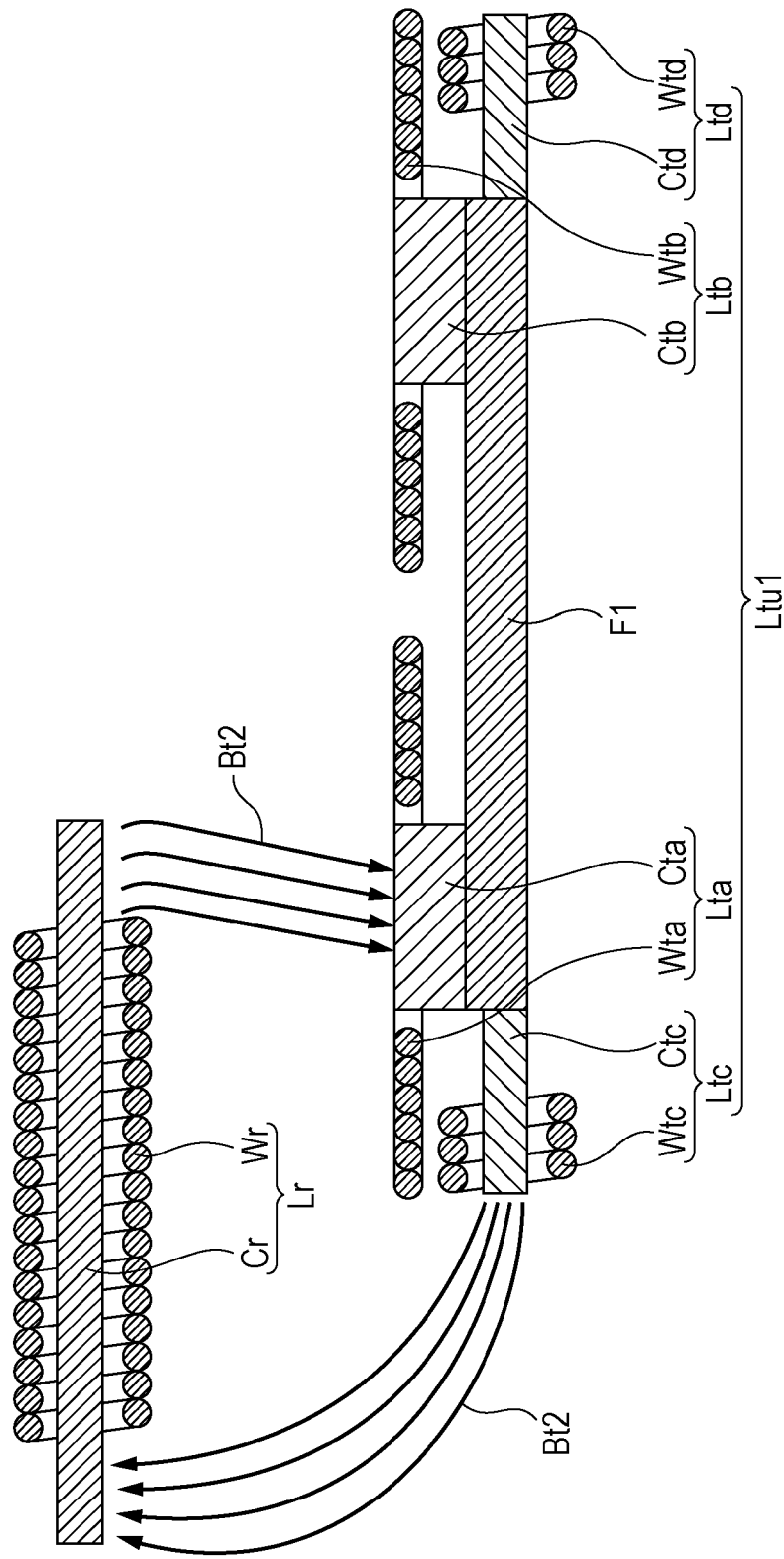

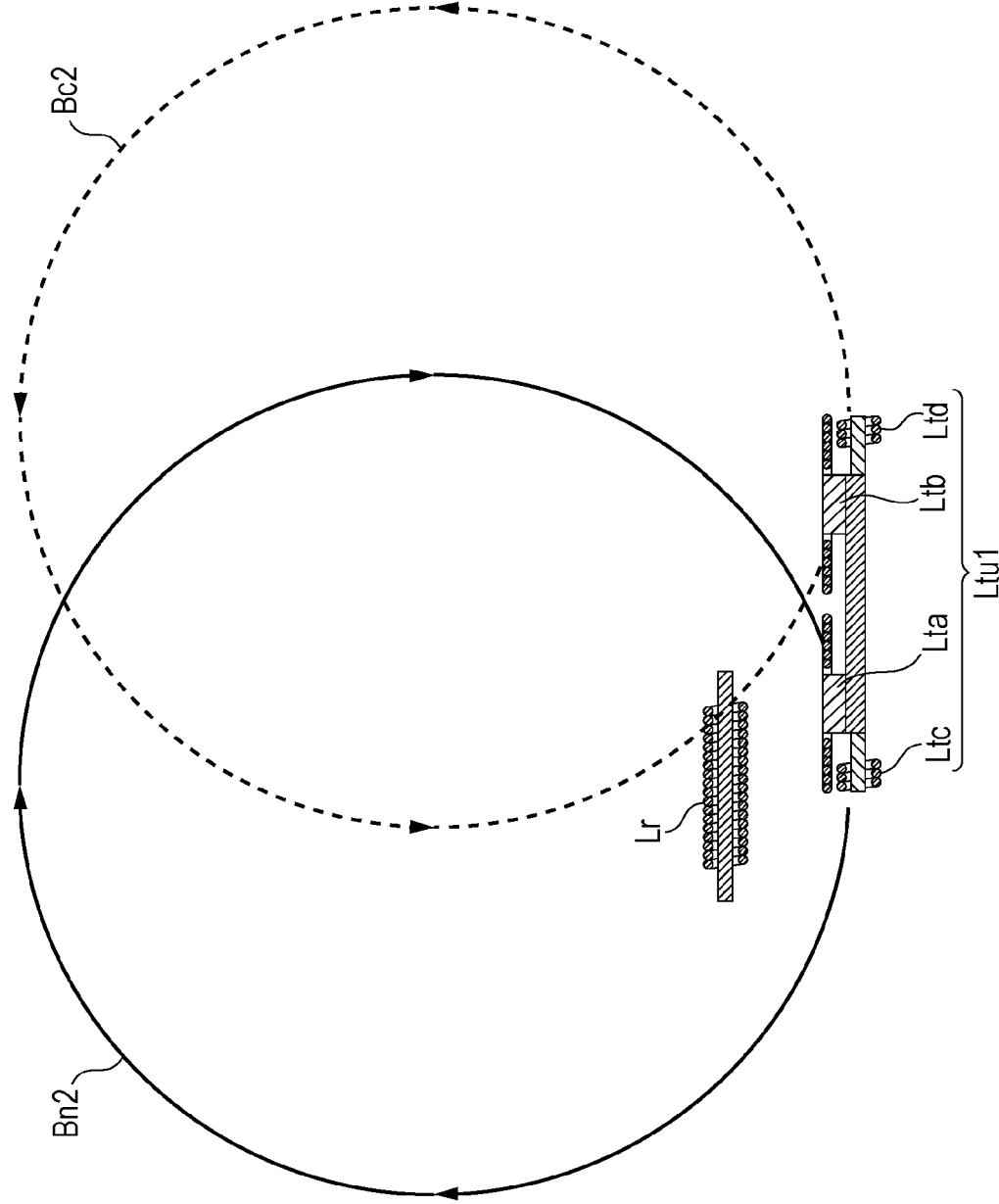

COIL UNIT HAVING PLURAL COILS FOR WIRELESS POWER TRANSMISSION

BACKGROUND OF THE INVENTION

1. Field of the Invention

The present invention relates to a coil unit for wirelessly feeding or receiving power.

2. Description of the Related Art

Wireless power transmission technology that utilizes an electromagnetic induction effect between a primary (power feeding) coil and a secondary (power receiving) coil that face each other to transmit power without any mechanical contact such as a cable has attracted attention recently.

In the application of the wireless power transmission technology described above to devices for power supply of electric vehicles and the like, it is anticipated that the positional relationship between a power feeding coil installed in the ground or the like and a power receiving coil mounted in an electric vehicle or the like will not necessarily be constant. Such a displacement between the power feeding coil and the power receiving coil would cause a significant decease in magnetic coupling between the coils, which may entail the problem of low power transmission efficiency.

As a solution to the above problem is proposed in Japanese Unexamined Patent Application Publication No. 2010-172084 a non-contact electric power supply device technology in which a plurality of cores disposed in a plane with intervals therebetween are used. Japanese Unexamined Patent Application Publication No. 2010-172084 discloses that the plurality of cores serve as an enlarged core whose dimensions include the gaps, allowing the non-contact electric power supply device to be robust to displacement.

In the technique disclosed in Japanese Unexamined Patent Application Publication No. 2010-172084, however, since the plurality of cores are disposed in a plane with intervals therebetween, a magnetic flux that circulates in a location away from the coils is likely to occur, providing robustness to displacement. On the contrary, it is problematic that the unwanted leakage magnetic field is likely to be formed in a location away from the coils. In particular, in the application of wireless power transmission technology to a charger for a power electronic device such as an electric vehicle, a large current needs to flow through a coil in order to meet the demand for high-power transmission, causing an increase in the strength of a leakage magnetic field formed in a location away from the coils. This may cause electromagnetic interference which might affect nearby electronic equipment and so forth.

SUMMARY OF THE INVENTION

Accordingly, an embodiment of the present invention provides a coil unit to reduce an unwanted leakage magnetic field formed in a location away from the coil unit while preventing or minimizing a reduction in the magnetic coupling between coils even if there is a displacement between the coils.

A coil unit according to an aspect of the present invention is a coil unit for use in wireless power transmission from a power feeding side to a power receiving side. The coil unit includes a first coil and a second coil that are apposed, a third coil located on a rear side of the first coil, a fourth coil located on a rear side of the second coil, and a drive control unit. An axial direction of the third coil and an axial direction of the fourth coil are nonparallel to an axial direction of the first coil and an axial direction of the second coil. The third and fourth coils are located so as to interpose a center of the first coil and a center of the second coil between the third and fourth coils, in a direction of the alignment of the first and second coils. The drive control unit controls a direction or phase of a current flowing in each of the first coil, the second coil, the third coil, and the fourth coil.

According to the aspect of the present invention, the drive control unit controls the direction or phase of the current flowing in each of the first to fourth coils. This allows that the directions of the currents flowing are matched each other between in the coils which are interlinked with the magnetic flux contributing to power transmission, in accordance with the displacement between the coil of the power feeding side and the coil of the power receiving side, and also allows that the magnetic flux which has the opposite direction of circulation to the one of the magnetic flux contributing to power transmission is generated by the coils which are not interlinked with the magnetic flux contributing to power transmission. Here, the third and fourth coils are located on the rear side of the first and second coils so as to interpose the center of the first coil and the center of the second coil between the third and fourth coils, in the direction of the alignment of the first and second coils. In addition, the axial directions of the third and fourth coils are nonparallel to the axial directions of the first and second coils. The configuration described above allows a magnetic flux that interlinks with the third and fourth coils to easily circulate also in a location away from the coil unit, and also allows a magnetic flux that contributes to power transmission to circulate also in a location more away from the coil unit. The configuration described above also allows a magnetic flux capable of canceling out the leakage magnetic field to circulate also in a location away from the coil unit. Accordingly, a magnetic flux that forms the unwanted leakage magnetic field in a location away from the coil unit would be canceled while a reduction in the magnetic coupling between coils is prevented or minimized even in a case where there is a displacement between the coils. Thus, a reduction in an unwanted leakage magnetic field formed in a location away from a coil unit may be achieved.

Preferably, the axial direction of the third coil is substantially perpendicular to the axial direction of the first coil, and the axial direction of the fourth coil is substantially perpendicular to the axial direction of the second coil. In this case, the third and fourth coils more easily generate a magnetic flux that largely circulates also in a location away from the coil unit. As a result, the effect of reducing an unwanted leakage magnetic field formed in a location away from coils while preventing or minimizing a reduction in the magnetic coupling between coils may further be enhanced even if there is a displacement between the coils.

Preferably, each of the first to fourth coils includes a magnetic core. Preferably, the magnetic core of the first coil is coupled to the magnetic core of the second coil, the magnetic core of the third coil is coupled to the magnetic core of the first coil, and the magnetic core of the fourth coil is coupled to the magnetic core of the second coil. In this case, all of the respective magnetic cores of the first to fourth coils are coupled to one another, allowing more efficient generation of a magnetic flux that contributes to power transmission and also allowing more efficient generation of a magnetic flux that cancels out the leakage magnetic field. As a result, the effect of reducing an unwanted leakage magnetic field formed in a location away from coils while preventing or minimizing a reduction in the magnetic coupling between the coils even may further be enhanced if there is a displacement between the coils.

According to an aspect of the present invention, therefore, it may be possible to provide a coil unit that reduces an unwanted leakage magnetic field formed in a location away from the coil unit while preventing or minimizing a reduction in the magnetic coupling between coils even if there is a displacement between the coils.

BRIEF DESCRIPTION OF THE DRAWINGS

FIG. 4A is a diagram schematically illustrating a magnetic flux contributing to power transmission in a case where there is a displacement between the power feeding coil unit and the power receiving coil in FIG. 2.

FIG. 4B is a diagram schematically illustrating a magnetic flux that largely circulates also in a location away from coils in a case where there is a displacement between the power feeding coil unit and the power receiving coil in FIG. 2.

DESCRIPTION OF THE PREFERRED EMBODIMENTS

An embodiment of the present invention will be described in detail with reference to the drawings. In the following description, substantially the same elements or elements having substantially the same function are given the same numerals or signs, and are not described again.

Figure 1:
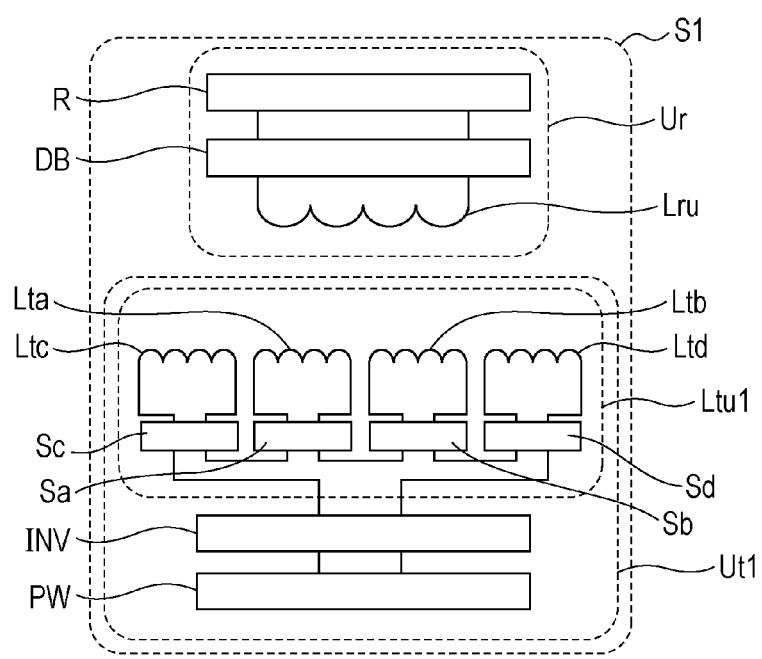
FIG. 1 is a system configuration diagram illustrating a wireless power transmission device, to which a coil unit according to a preferred embodiment of the present invention is applied, together with a load.

First, an overall configuration of a wireless power transmission device S1 to which a coil unit according to a preferred embodiment of the present invention is applied will be described with reference to FIG. 1. FIG. 1 is a system configuration diagram illustrating a wireless power transmission device to which the coil unit according to the preferred embodiment of the present invention is applied, together with a load. The coil unit according to the preferred embodiment of the present invention is applicable to either a power feeding coil unit in a wireless power feeding device or a power receiving coil unit in a wireless power receiving device. In the following embodiment, an example in which the coil unit according to the preferred embodiment of the present invention is applied to a power feeding coil unit in a wireless power feeding device will be described.

As illustrated in FIG. 1, the wireless power transmission device S1 includes a wireless power feeding device Ut1 and a wireless power receiving device Ur.

The wireless power feeding device Ut1 includes a power source PW, an inverter INV, and a power feeding coil unit Ltu1. The wireless power receiving device Ur includes a power receiving coil Lr and a rectifier circuit DB.

First, the configuration of the wireless power feeding device Ut1 will be described. The power source PW supplies direct-current (DC) power to the inverter INV, described below. The power source PW is not limited to any particular one, and may be any power source that outputs DC power. Examples of such a power source may include a DC power source that is generated by rectifying and smoothing a commercial alternating-current (AC) power source, a secondary battery, a solar photovoltaic DC power source, and a switching power source device such as a switching converter.

The inverter INV has a function to convert input DC power supplied from the power source PW into AC power. In this embodiment, the inverter INV converts input DC power supplied from the power source PW into AC power, and supplies the AC power to the power feeding coil unit Ltu1 described below. The inverter INV may be implemented as a switching circuit having a plurality of switching elements bridge-connected. Examples of the switching elements of the switching circuit may include metal oxide semiconductor-field effect transistor (MOSFET) elements and insulated gate bipolar transistor (IGBT) elements.

The power feeding coil unit Ltu1 has a function to feed AC power supplied from the inverter INV to a power receiving coil unit Lru described below. In a case where the wireless power transmission device S1 according to this embodiment is used for an electric power supply facility for a vehicle such as an electric vehicle, the power feeding coil unit Ltu1 will be installed in or on, or near, the ground.

Next, the configuration of the wireless power receiving device Ur will be described. The power receiving coil Lr has a function to receive the AC power fed from the power feeding coil unit Ltu1. In a case where the wireless power transmission device S1 according to this embodiment is used for an electric power supply facility for a vehicle such as an electric vehicle, the power receiving coil Lr will be mounted on the bottom of the vehicle.

The rectifier circuit DB has a function to rectify the AC power received by the power receiving coil Lr to DC power. Examples of the rectifier circuit DB may include a converter circuit having a full-wave rectifying function that uses a diode bridge and a power smoothing function that uses a capacitor and a three-terminal regulator. The DC power obtained by rectification by the rectifier circuit DB is output to a load R. Examples of the load R may include, in a case where the wireless power transmission device S1 according to this embodiment is used for an electric power supply facility for a vehicle such as an electric vehicle, a secondary battery and a rotating machine that are included in the vehicle. In a case where the load R is an AC rotating machine, the wireless power receiving device Ur will require an additional inverter (not illustrated) between the rectifier circuit DB and the load R to supply AC power to the AC rotating machine.

Figure 2:
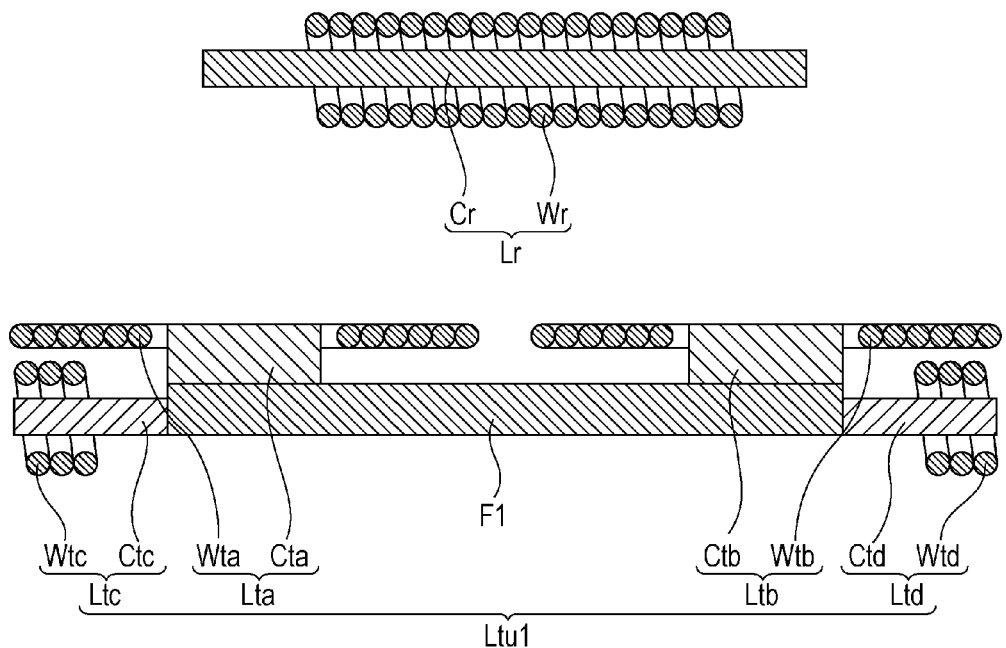
FIG. 2 is a cross-sectional view illustrating a power feeding coil unit according to the preferred embodiment of the present invention together with a power receiving coil.

The power feeding coil unit Ltu1 according to the preferred embodiment of the present invention and the power receiving coil Lr will now be described in detail with reference to FIG. 1 and FIG. 2. FIG. 2 is a cross-sectional view illustrating the power feeding coil unit according to the preferred embodiment of the present invention together with a power receiving coil.

As illustrated in FIG. 1 and FIG. 2, the power feeding coil unit Ltu1 includes first to fourth drive control units Sa to Sd, first to fourth coils Lta to Ltd, and a magnetic body F1. In this embodiment, the first to fourth coils Lta to Ltd are electrically connected in series with one another via the first to fourth drive control units Sa to Sd.

The first to fourth drive control units Sa to Sd control the directions or phases of the currents flowing in the first to fourth coils Lta to Ltd, respectively. In this embodiment, current-phase control is control to supply in-phase or opposite-phase currents to a coil. In this embodiment, therefore, current-phase control is substantially synonymous with the control of the directions of the currents flowing in a coil. The first to fourth drive control units Sa to Sd may perform phase control by using an inverter, a thyristor, or the like. Alternatively, a circuit for selecting the direction of the current flowing in each of the first to fourth coils Lta to Ltd by using a mechanical switch or the like may achieve the first to fourth drive control units Sa to Sd in a relatively easy way. Specifically, the first drive control unit Sa controls the direction (phase) of the current flowing in the first coil Lta, the second drive control unit Sb controls the direction (phase) of the current flowing in the second coil Ltb, the third drive control unit Sc controls the direction (phase) of the current flowing in the third coil Ltc, and the fourth drive control unit Sd controls the direction (phase) of the current flowing in the fourth coil Ltd.

The first coil Lta includes a magnetic core Cta and a wire Wta. The first coil Lta is a planar-shaped spiral coil having a substantially rectangular shape, and is formed by winding the wire Wta, which is made of a Litz wire such as a copper wire or an aluminum wire, around the magnetic core Cta. The axial direction of the first coil Lta is parallel to the opposing direction of the first and second coils Lta and Ltb and the power receiving coil Lr described below. The number of turns of the first coil Lta is appropriately set on the basis of the separation distance between the first coil Lta and the power receiving coil Lr described below, the desired power transmission efficiency, and so forth.

The second coil Ltb includes a magnetic core Ctb and a wire Wtb. The second coil Ltb is a planar-shaped spiral coil having a substantially rectangular shape, and is formed by winding the wire Wtb, which is made of a Litz wire such as a copper wire or an aluminum wire, around the magnetic core Ctb. The axial direction of the second coil Ltb is parallel to the opposing direction of the first and second coils Lta and Ltb and the power receiving coil Lr described below. The second coil Ltb is apposed in the same plane as the first coil Lta. The arrangement interval of the first and second coils Lta and Ltb and the number of turns of the second coil Ltb are appropriately set on the basis of the separation distance between the second coil Ltb and the power receiving coil Lr described below, the desired power transmission efficiency, and so forth.

The third coil Ltc includes a magnetic core Ctc and a wire Wtc. The third coil Ltc is a solenoid coil wound in a helical shape, and is formed by winding the wire Wtc, which is made of a Litz wire such as a copper wire or an aluminum wire, around the magnetic core Ctc, which is shaped into a plate or a bar. The axial direction of the third coil Ltc is nonparallel to the axial direction of the first coil Lta. The configuration described above allows the magnetic flux generated by the third coil Ltc to easily circulate also in a location away from the third coil Ltc. In this embodiment, the axial direction of the third coil Ltc is perpendicular to the axial direction of the first coil Lta. In this case, the third coil Ltc more facilitates the generation of a magnetic flux circulating also in a location away from the third coil Ltc. In addition, the third coil Ltc is located on the rear side of the first coil Lta. That is, the third coil Ltc is located on the opposite to a side of the first and second coils Lta and Ltb facing the power receiving coil Lr described below. More specifically, the third coil Ltc is located so as to overlap the first coil Lta when viewed from the opposing direction of the first and second coils Lta and Ltb and the power receiving coil Lr described below.

The fourth coil Ltd includes a magnetic core Ctd and a wire Wtd. The fourth coil Ltd is a solenoid coil wound in a helical shape, and is formed by winding the wire Wtd, which is made of a Litz wire such as a copper wire or an aluminum wire, around the magnetic core Ctd, which is shaped into a plate or a bar. The axial direction of the fourth coil Ltd is nonparallel to the axial direction of the second coil Ltb. The configuration described above allows the magnetic flux generated by the fourth coil Ltd to easily circulate also in a location away from the fourth coil Ltd. In this embodiment, the axial direction of the fourth coil Ltd is perpendicular to the axial direction of the second coil Ltb. In this case, the fourth coil Ltd more facilitates the generation of a magnetic flux circulating also in a location away from the fourth coil Ltd. In addition, the fourth coil Ltd is located on the rear side of the second coil Ltb. That is, the fourth coil Ltd is located on the opposite to the side of the first and second coils Lta and Ltb facing the power receiving coil Lr described below. More specifically, the fourth coil Ltd is located so as to overlap the second coil Ltb when viewed from the opposing direction of the first and second coils Lta and Ltb and the power receiving coil Lr described below.

The third and fourth coils Ltc and Ltd are located so as to interpose the center of the first coil Lta and the center of the second coil Ltb between the third and fourth coils Ltc and Ltd, in the direction of the alignment of the first and second coils Lta and Ltb. That is, the third coil Ltc and the fourth coil Ltd are arranged so as to be located on both outer sides of the first and second coils Lta and Ltb in the direction of the alignment the first and second coils Lta and Ltb. In this case, the third and fourth coils Ltc and Ltd facilitate the generation of a magnetic flux circulating also in a location away from the power feeding coil unit Ltu1.

The magnetic body F1 extends along a surface on the opposite to the side of the first and second coils Lta and Ltb facing the power receiving coil Lr described below. In this embodiment, as illustrated in FIG. 2, the magnetic body F1 is connected to each of the magnetic core Cta of the first coil Lta and the magnetic core Ctb of the second coil Ltb near either end of the surface on a side of the magnetic body F1 closer to the power receiving coil Lr described below (i.e., the upper surface in FIG. 2) in the opposing direction of the first and second coils Lta and Ltb and the power receiving coil Lr described below. As illustrated in FIG. 2, furthermore, the magnetic body F1 is further connected to each of the magnetic core Ctc of the third coil Ltc and the magnetic core Ctd of the fourth coil Ltd on either side surface (i.e., the left and right side surfaces in FIG. 2) of the magnetic body F1 in the direction of alignment of the first and second coils Lta and Ltb. The configuration described above allows the magnetic core Cta of the first coil Lta to be coupled to the magnetic core Ctb of the second coil Ltb, the magnetic core Ctc of the third coil Ltc to be coupled to the magnetic core Cta of the first coil Lta, and the magnetic core Ctd of the fourth coil Ltd to be coupled to the magnetic core Ctb of the second coil Ltb. That is, all the magnetic cores Cta to Ctd of the first to fourth coils Lta to Ltd are coupled to one another, allowing more efficient generation of a magnetic flux that contributes to power transmission and also allowing more efficient generation of a magnetic flux that cancels out the leakage magnetic field. As a result, the effect of reducing an unwanted leakage magnetic field formed in a location away from coils while preventing or minimizing a reduction in the magnetic coupling between the coils even may further be enhanced if there is a displacement between the coils.

As illustrated in FIG. 2, the power receiving coil Lr includes a magnetic core Cr and a wire Wr. The power receiving coil Lr is a solenoid coil wound in a helical shape, and is formed by winding the wire Wr around the magnetic core Cr, which is shaped into a plate or a bar.

Figure 3A:
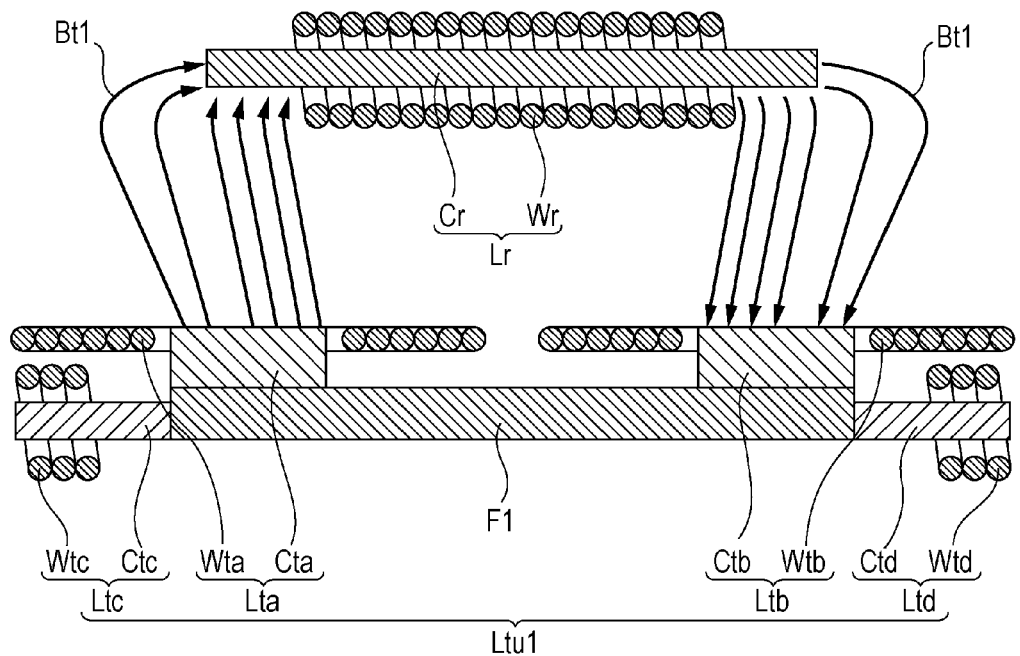
FIG. 3A is a diagram schematically illustrating a magnetic flux contributing to power transmission in a case where there is no displacement between the power feeding coil unit and the power receiving coil in FIG. 2.
Figure 3B:
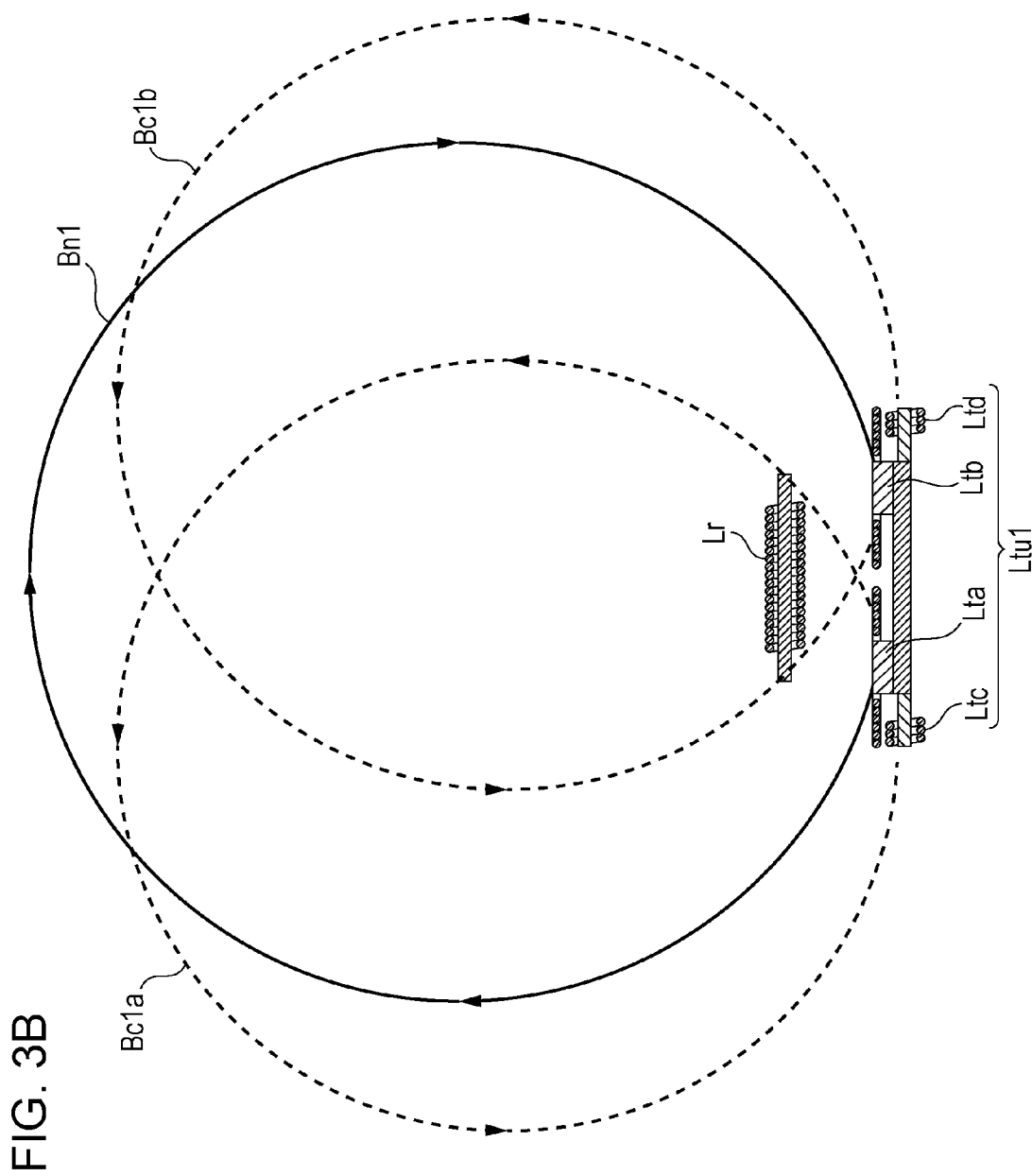
FIG. 3B is a diagram schematically illustrating a magnetic flux that largely circulates also in a location away from coils in a case where there is no displacement between the power feeding coil unit and the power receiving coil in FIG. 2.

The relative relationship between magnetic fluxes generated by the first to fourth coils Lta to Ltd in accordance with a position between coils and the effect of reducing the unwanted leakage magnetic field will now be described in detail with reference to FIGS. 3A and 3B and FIGS. 4A and 4B. FIG. 3A is a diagram schematically illustrating a magnetic flux contributing to power transmission in a case where there is no displacement between the power feeding coil unit Ltu1 and the power receiving coil Lr in FIG. 2. FIG. 3B is a diagram schematically illustrating a magnetic flux that largely circulates also in a location away from the power feeding coil unit Ltu1 and the power receiving coil Lr in a case where there is no displacement between the power feeding coil unit Ltu1 and the power receiving coil Lr in FIG. 2. FIG. 4A is a diagram schematically illustrating a magnetic flux contributing to power transmission in a case where there is a displacement between the power feeding coil unit Ltu1 and the power receiving coil Lr in FIG. 2. FIG. 4B is a diagram schematically illustrating a magnetic flux that largely circulates also in a location away from the power feeding coil unit Ltu1 and the power receiving coil Lr in a case where there is a displacement between the power feeding coil unit Ltu1 and the power receiving coil Lr in FIG. 2. Note that the magnetic fluxes illustrated in FIGS. 3A and 3B and in FIGS. 4A and 4B schematically depict only the orientations of the individual magnetic fluxes, and do not depict the magnetic flux densities. In FIGS. 3A and 3B and FIGS. 4A and 4B, the magnetic flux in the magnetic cores Cta to Ctd of the first to fourth coils Lta to Ltd, the magnetic body F1, and the magnetic core Cr of the power receiving coil Lr is not illustrated.

First, the relative relationship between magnetic fluxes generated by the first to fourth coils Lta to Ltd in a case where there is no displacement between the power feeding coil unit Ltu1 and the power receiving coil Lr and the effect of reducing the unwanted leakage magnetic field will be described in detail with reference to FIGS. 3A and 3B. In the illustrated example, the state where there is no displacement refers to a state where the imaginary line connecting the center point of the power feeding coil unit Ltu1 and the center point of the power receiving coil Lr is parallel to the axial direction of the first and second coils Lta and Ltb.

In a case where there is no displacement between the power feeding coil unit Ltu1 and the power receiving coil Lr, as illustrated in FIG. 3A, the first and second coils Lta and Ltb generate a magnetic flux Bt1 that contributes to power transmission. Specifically, the magnetic flux Bt1 generated by the first and second coils Lta and Ltb, when interlinking the first coil Lta in the direction from the first coil Lta to the power receiving coil Lr (i.e., vertically upward in FIG. 3A), interlinks the second coil Ltb in the direction from the power receiving coil Lr to the second coil Ltb (i.e., vertically downward in FIG. 3A). That is, the magnetic flux Bt1 interlinks with the first coil Lta and interlinks with the second coil Ltb in opposite directions. In order to generate the magnetic flux Bt1 described above, it may be sufficient that the direction of the magnetic field generated by the first coil Lta and the direction of the magnetic field generated by the second coil Ltb are opposite to each other. For example, in a case where the first coil Lta and the second coil Ltb are wound in the same direction, it may be sufficient that the first drive control unit Sa and the second drive control unit Sb control the phases of the currents to be supplied from the inverter INV to the first coil Lta and the second coil Ltb, respectively, so that the current to be supplied to the first coil Lta and the current to be supplied to the second coil Ltb are in opposite phase to each other. In a case where the first coil Lta and the second coil Ltb are wound in opposite directions, it may be sufficient that the first drive control unit Sa and the second drive control unit Sb control the phases of the currents to be supplied from the inverter INV to the first coil Lta and the second coil Ltb, respectively, so that the current to be supplied to the first coil Lta and the current to be supplied to the second coil Ltb are in phase with each other. The interlinking of the magnetic flux Bt1 with the power receiving coil Lr induces an electromotive force in the wire Wr of the power receiving coil Lr. The power generated in the power receiving coil Lr is rectified by the rectifier circuit DB, and is output to the load R.

In this case, as illustrated in FIG. 3B, in addition to the magnetic flux Bt1, the first and second coils Lta and Ltb also generate a magnetic flux Bn1 that interlinks the first coil Lta in the direction from the first coil Lta to the power receiving coil Lr (i.e., vertically upward in FIG. 3B) and that interlinks the second coil Ltb in the direction from the power receiving coil Lr to the second coil Ltb (i.e., vertically downward in FIG. 3B) while largely circulating (i.e., clockwise in FIG. 3B) also in a location away from the coils Lta, Ltb, and Lr. As illustrated in FIG. 3B, further, the third coil Ltc generates a magnetic flux Bc1$a$ that interlinks the first coil Lta in the direction from the first coil Lta to the power receiving coil Lr (i.e., vertically upward in FIG. 3B) and that interlinks the third coil Ltc in the direction from the third coil Ltc to the first coil Lta (i.e., horizontally rightward in FIG. 3B) while largely circulating (i.e., counterclockwise in FIG. 3B) also in a location away from the coils Lta, Ltc, and Lr. Similarly, as illustrated in FIG. 3B, the fourth coil Ltd generates a magnetic flux Bc1$b$ that interlinks the fourth coil Ltd in the direction from the second coil Ltb to the fourth coil Ltd (i.e., horizontally rightward in FIG. 3B) and that interlinks the second coil Ltb in the direction from the power receiving coil Lr to the second coil Ltb (i.e., vertically downward in FIG. 3B) while largely circulating (i.e., counterclockwise in FIG. 3B) also in a location away from the coils Ltb, Ltd, and Lr.

In order to generate the magnetic fluxes Bc1$a$ and Bc1$b$ described above, it may be sufficient that, for example, the third drive control unit Sc controls the phase of the current to be supplied from the inverter INV to the third coil Ltc so that the direction of the current flowing through a portion of the wire Wtc of the third coil Ltc in closest proximity to the wire Wta of the first coil Lta (i.e., the upper portion of the wire Wtc of the third coil Ltc in FIG. 3A) is the same as the direction of the current flowing through a portion of the wire Wta of the first coil Lta in closest proximity to the wire Wtc of the third coil Ltc (i.e., the left-hand portion of the wire Wta of the first coil Lta in FIG. 3A). It may also be sufficient that the fourth drive control unit Sd controls the phase of the current to be supplied from the inverter INV to the fourth coil Ltd so that the direction of the current flowing through a portion of the wire Wtd of the fourth coil Ltd in closest proximity to the wire Wtb of the second coil Ltb (i.e., the upper portion of the wire Wtd of the fourth coil Ltd in FIG. 3A) is the same as the direction of the current flowing through a portion of the wire Wtb of the second coil Ltb in closest proximity to the wire Wtd of the fourth coil Ltd (i.e., the right-hand portion of the wire Wtb of the second coil Ltb in FIG. 3A).

Here, the magnetic flux Bn1 does not interlink with the power receiving coil Lr, and thus becomes a magnetic flux that does not contribute to power transmission and that forms an unwanted leakage magnetic field around the associated coils. As described above, the magnetic flux Bc1$a$ generated by the third coil Ltc and the magnetic flux Bc1$b$ generated by the fourth coil Ltd also circulate in a location away from the associated coils. The directions of circulation of the magnetic fluxes Bc1$a$ and Bc1$b$ (i.e., counterclockwise in FIG. 3B) is opposite to the direction of circulation of the magnetic flux Bn1 generated by the first and second coils Lta and Ltb (i.e., clockwise in FIG. 3B). That is, the magnetic flux Bn1 generated by the first and second coils Lta and Ltb and the magnetic fluxes Bc1$a$ and Bc1$b$ generated by the third and fourth coils Ltc and Ltd cancel each other out in a location away from the power feeding coil unit Ltu1. Accordingly, the magnetic flux density in a location away from the power feeding coil unit Ltu1 is reduced, resulting in a reduction in unwanted leakage magnetic field.

The relative relationship between magnetic fluxes generated by the first to fourth coils Lta to Ltd in a case where there is a displacement between the power feeding coil unit Ltu1 and the power receiving coil Lr and the effect of reducing the unwanted leakage magnetic field will now be described in detail with reference to FIGS. 4A and 4B. In the example illustrated in FIGS. 4A and 4B, the power receiving coil Lr is displaced with respect to the third coil Ltc.

In a case where there is a displacement between the power feeding coil unit Ltu1 and the power receiving coil Lr, as illustrated in FIG. 4A, the first and third coils Lta and Ltc generate a magnetic flux Bt2 that contributes to power transmission. Specifically, the magnetic flux Bt2 contributing to power transmission, when interlinking the first coil Lta in the direction from the power receiving coil Lr to the first coil Lta (i.e., vertically downward in FIG. 4A), interlinks the third coil Ltc in the direction from the first coil Lta to the third coil Ltc (i.e., horizontally leftward in FIG. 4A). In order to generate the magnetic flux Bt2 described above, it may be sufficient that, for example, the first and third drive control units Sa and Sc control the phases of the currents to be supplied from the inverter INV to the first and third coils Lta and Ltc, respectively, so that the direction of the current flowing through a portion of the wire Wtc of the third coil Ltc in closest proximity to the wire Wta of the first coil Lta (i.e., the upper portion of the wire Wtc of the third coil Ltc in FIG. 4A) is the same as the direction of the current flowing through a portion of the wire Wta of the first coil Lta in closest proximity to the wire Wtc of the third coil Ltc (i.e., the left-hand portion of the wire Wta of the first coil Lta in FIG. 4A). The interlinking of the magnetic flux Bt2 with the power receiving coil Lr induces an electromotive force in the wire Wr of the power receiving coil Lr. The power generated in the power receiving coil Lr is rectified by the rectifier circuit DB, and is output to the load R. In this embodiment, since the axial direction of the third coil Ltc is perpendicular to the axial direction of the first and second coils Lta and Ltb, the magnetic flux Bt2 generated by the first and third coils Lta and Ltc easily largely circulates along the outside of the power feeding coil unit Ltu1. That is, the magnetic flux Bt2 interlinking with the power receiving coil Lr is easily generated even if there is a displacement between the power feeding coil unit Ltu1 and the power receiving coil Lr.

In this case, as illustrated in FIG. 4B, in addition to the magnetic flux Bt2, the first and third coils Lta and Ltc also generate a magnetic flux Bn2 that interlinks the first coil Lta in the direction from the power receiving coil Lr to the first coil Lta (i.e., vertically downward in FIG. 4B) and that interlinks the third coil Ltc in the direction from the first coil Lta to the third coil Ltc (i.e., horizontally leftward in FIG. 4B) while largely circulating (i.e., clockwise in FIG. 4B) also in a location away from the coils Lta, Ltc, and Lr. As illustrated in FIG. 4B, further, the second and fourth coils Ltb and Ltd generate a magnetic flux Bc2 that interlinks the second coil Ltb in the direction from the power receiving coil Lr to the second coil Ltb (i.e., vertically downward in FIG. 4B) and that interlinks the fourth coil Ltd in the direction from the second coil Ltb to the fourth coil Ltd (i.e., horizontally rightward in FIG. 4B) while largely circulating (i.e., counterclockwise in FIG. 4B) also in a location away from the coils Ltb, Ltd, and Lr.

In order to generate the magnetic flux Bc2 described above, first, it may be sufficient that the direction of the magnetic field generated by the second coil Ltb is the same as the direction of the magnetic field generated by the first coil Lta. For example, in a case where the first coil Lta and the second coil Ltb are wound in the same direction, it may be sufficient that the second drive control unit Sb controls the phase of the current to be supplied from the inverter INV to the second coil Ltb so that the current to be supplied to the second coil Ltb is in phase with the phase of the current to be supplied to the first coil Lta. In a case where the first coil Lta and the second coil Ltb are wound in opposite directions, it may be sufficient that the second drive control unit Sb controls the phase of the current to be supplied from the inverter INV to the second coil Ltb so that the current to be supplied to the second coil Ltb is in opposite phase to the current to be supplied to the first coil Lta. It may also be sufficient that the fourth drive control unit Sd controls the phase of the current to be supplied from the inverter INV to the fourth coil Ltd so that the direction of the current flowing through a portion of the wire Wtd of the fourth coil Ltd in closest proximity to the wire Wtb of the second coil Ltb (i.e., the upper portion of the wire Wtd of the fourth coil Ltd in FIG. 4B) is the same as the direction of the current flowing through a portion of the wire Wtb of the second coil Ltb in closest proximity to the wire Wtd of the fourth coil Ltd (i.e., the right-hand portion of the wire Wtb of the second coil Ltb in FIG. 4B).

Here, the magnetic flux Bn2 does not interlink with the power receiving coil Lr, and thus becomes a magnetic flux that does not contribute to power transmission and that forms an unwanted leakage magnetic field around the associated coils. As described above, the magnetic flux Bc2 generated by the second and fourth coils Ltb and Ltd also circulates in a location away from the associated coils. The direction of circulation of the magnetic flux Bc2 (i.e., counterclockwise in FIG. 4B) is opposite to the direction of circulation of the magnetic flux Bn2 generated by the first and third coils Lta and Ltc (i.e., clockwise in FIG. 4B). That is, the magnetic flux Bn2 generated by the first and third coils Lta and Ltc and the magnetic flux Bc2 generated by the second and fourth coils Ltb and Ltd cancel each other out in a location away from the power feeding coil unit Ltu1. Accordingly, the magnetic flux density in a location away from the power feeding coil unit Ltu1 is reduced, resulting in a reduction in unwanted leakage magnetic field.

In the manner described above, the first to fourth drive control units Sa to Sd control the directions of the currents flowing in the first to fourth coils Lta to Ltb, respectively, enabling the generation of the magnetic fluxes Bt1 and Bt2 contributing to power transmission regardless of whether there is a displacement or not between the power feeding coil unit Ltu1 and the power receiving coil Lr. This also enables simultaneous generation of the magnetic fluxes Bc1a, Bc1b, and Bc2 capable of canceling the magnetic fluxes Bn1 and Bn2, which form an unwanted leakage magnetic field, in a location away from the power feeding coil unit Ltu1. Accordingly, even in a case where there is a displacement between coils, an unwanted leakage magnetic field formed in a location away from coils may be reduced with a reduction in the magnetic coupling between the coils. In the illustrated example, the description has been given of the case where the power receiving coil Lr is displaced with respect to the third coil Ltc. The same applies in a case where the power receiving coil Lr is displaced with respect to the fourth coil Ltd.

In the manner described above, the power feeding coil unit Ltu1 according to this embodiment is configured such that the first to fourth drive control units Sa to Sd control the directions or phases of the currents flowing in the first to fourth coils Lta to Ltd, respectively. This allows that the directions of the currents flowing are matched each other between in the coils which are interlinked with the magnetic flux contributing to power transmission, in accordance with the displacement between the power feeding coil unit Ltu1 and the power receiving coil Lr, and also allows that the magnetic flux which has the opposite direction of circulation to the one of the magnetic flux contributing to power transmission is generated by the coils which are not interlinked with the magnetic flux contributing to power transmission. Here, the third and fourth coils Ltc and Ltd are located on the rear side of the first and second coils Lta and Ltb so as to interpose the center of the first coil Lta and the center of the second coil Ltb between the third and fourth coils Ltc and Ltd, in the direction of the alignment of the first and second coils Lta and Ltb. In addition, the axial direction of the third and fourth coils Ltc and Ltd is nonparallel to the axial direction of the first and second coils Lta and Ltb. The configuration described above allows a magnetic flux that interlinks with the third and fourth coils Ltc and Ltd to easily circulate also in a location away from the power feeding coil unit Ltu1, and also allows a magnetic flux that contributes to power transmission to circulate also in a location more away from the power feeding coil unit Ltu1. The configuration described above also allows a magnetic flux capable of canceling out the leakage magnetic field to circulate also in a location away from the power feeding coil unit Ltu1. Accordingly, a magnetic flux that forms an unwanted leakage magnetic field generated in a location away from the power feeding coil unit Ltu1 would be canceled while a reduction in the magnetic coupling between coils is prevented or minimized even in a case where there is a displacement between the coils. Thus, a reduction in an unwanted leakage magnetic field formed in a location away from the power feeding coil unit Ltu1 may be achieved.

Hereinafter, advantages achievable with this embodiment, which prevent or minimize a reduction in power transmission efficiency while reducing an unwanted leakage magnetic field formed in a location away from a power feeding coil unit, will be specifically described with reference to Example 1 and Comparative Example 1.

In Example 1, the wireless power transmission device S1 according to the preferred embodiment described above was used. In Comparative Example 1, for comparison with Example 1 in terms of characteristics, a wireless power transmission device configured such that the wireless power transmission device S1 according to the preferred embodiment does not include the third and fourth coils Ltc and Ltd and the first to fourth drive control units Sa to Sd was used.

Figure 5:
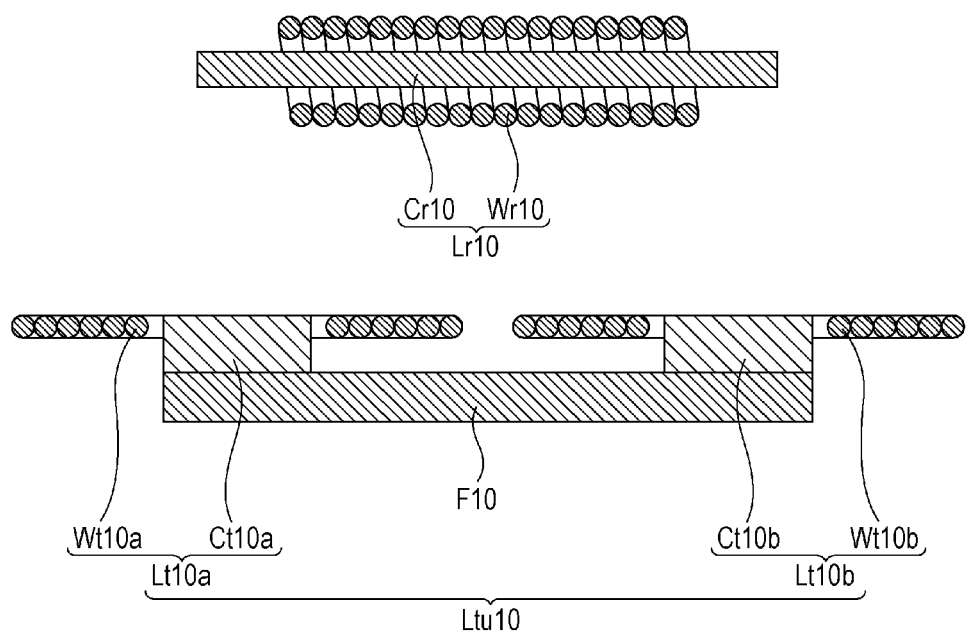
FIG. 5 is a cross-sectional view illustrating a power feeding coil unit in Comparative Example 1 together with a power receiving coil unit.

First, the configuration of a power feeding coil unit Ltu10 and a power receiving coil Lr10 in the wireless power transmission device in Comparative Example 1 will be described with reference to FIG. 5. FIG. 5 is a cross-sectional view illustrating the power feeding coil unit in Comparative Example 1 together with a power receiving coil. The power feeding coil unit Ltu10 includes a magnetic body F10 and first and second coils Lt10a and Lt10b. Each of the first and second coils Lt10a and Lt10b is a planar-shaped spiral coil having a substantially rectangular shape. The first coil Lt10a is formed by winding a wire Wt10a around a magnetic core Ct10a, and the second coil Lt10b is formed by winding a wire Wt10b around a magnetic core Ct10b. The first coil Lt10a and the second coil Lt10b are wound in opposite directions, and the first coil Lt10a and the second coil Lt10b are connected in series with the inverter INV. The magnetic cores Ct10a and Ct10b are connected to each other through the magnetic body F10. That is, the power feeding coil unit Ltu10 in Comparative Example 1 is equivalent to a configuration in which the third coil Ltc, the fourth coil Ltd, and the first to fourth drive control units Sa to Sd are excluded from the power feeding coil unit Ltu1 of the wireless power transmission device S1 in Example 1. The power receiving coil Lr10 is a solenoid coil wound in a helical shape, and is formed by winding a wire Wr10 around a magnetic core Cr10 shaped into a plate or a bar. The power receiving coil Lr10 in Comparative Example 1 is similar to the power receiving coil Lr in the wireless power transmission device S1 in Example 1.

Here, in Example 1 and Comparative Example 1, a Litz wire with a diameter of approximately 6 mm which is formed by twisting approximately 4000 polyimide-coated copper wires each having a diameter of 0.05 mm was used for each of the wires Wta to Wtd, Wt10a, and Wt10b of the first to fourth coils Lta to Ltd and the first and second coils Lt10a and Lt10b, and the wires Wr and Wr10 of the power receiving coils Lr and Lr10. In addition, ferrite cores of the same material (with a relative magnetic permeability of approximately 3000) were used for the magnetic cores Cta to Ctd, Ct10a, and Ct10b of the first to fourth coils Lta to Ltd and the first and second coils Lt10a and Lt10b, the magnetic bodies F1 and F10, and the magnetic cores Cr and Cr10 of the power receiving coils Lr and Lr10.

Furthermore, in the power feeding coil unit Ltu1 in Example 1, the magnetic body F1 having a length of 300 mm, a width of 300 mm, and a thickness of 15 mm, the magnetic cores Cta and Ctb of the first and second coils Lta and Ltb each having a length of 100 mm, a width of 300 mm, and a thickness of 24 mm, the magnetic cores Ctc and Ctd of the third and fourth coils Ltc and Ltd each having a length of 40 mm, a width of 300 mm, and a thickness of 15 mm, and the magnetic core Cr of the power receiving coil Lr having a length of 300 mm, a width of 300 mm, and a thickness of 10 mm were used. In the power feeding coil unit Ltu10 in Comparative Example 1, the magnetic body F10 having a length of 300 mm, a width of 300 mm, and a thickness of 15 mm, the magnetic cores Ct10a and Ct10b of the first and second coils Lt10a and Lt10b each having a length of 100 mm, a width of 300 mm, and a thickness of 24 mm, and the magnetic core Cr10 of the power receiving coil Lr10 having a length of 300 mm, a width of 300 mm, and a thickness of 10 mm were used.

Moreover, in the power feeding coil unit Ltu1 in Example 1 and the power feeding coil unit Ltu10 in Comparative Example 1, the number of turns of each of the first and second coils Lta, Ltb, Lt10a, and Lt10b was set to 10, and the number of turns of each of the power receiving coils Lr and Lr10 was set to 10. In the power feeding coil unit Ltu1 in Example 1, furthermore, the number of turns of each of the third and fourth coils Ltc and Ltd was set to 5.

In each of Example 1 and Comparative Example 1, the distance between the coil unit and the power receiving coil was set to 150 mm.

Then, in each of Example 1 and Comparative Example 1, the coefficient of magnetic coupling between the power feeding coil unit and the power receiving coil and the unwanted leakage magnetic field were measured. This measurement was repeatedly conducted with no displacement of the power receiving coil, that is, with the distance between the power feeding coil unit and the power receiving coil being kept at 150 mm while the power receiving coil was moved in the axial direction of the power receiving coil, starting from, as a reference position, the state where the distance between the center of the power feeding coil unit and the center of the power receiving coil was also 150 mm, until the coupling coefficient described below became less than or equal to 0.05. The amount of movement of the power receiving coil from the reference position is defined as displacement, and the direction in which the power receiving coil is moved toward the first coil is defined as forward direction.

In Example 1, when the amount of displacement of the power receiving coil Lr with respect to the power feeding coil unit Ltu1 was in the range of approximately ±100 mm, the first to fourth drive control units Sa to Sd controlled the phase of the current to be supplied from the inverter INV to the respective coils so that the first and second coils Lta and Ltb generated a magnetic flux that interlinks the first and second coils Lta and Ltb and the third and fourth coils Ltc and Ltd generated a magnetic flux that circulates in the opposite direction to the direction of circulation of the magnetic flux generated by the first and second coils Lta and Ltb. When the amount of displacement of the power receiving coil Lr with respect to the power feeding coil unit Ltu1 was outside the range of approximately ±100 mm, the first to fourth drive control units Sa to Sd controlled the phases of the currents to be supplied from the inverter INV to the respective coils so that the direction of circulation of the magnetic flux generated by the first and third coils Lta and Ltc and the direction of circulation of the magnetic flux generated by the second and fourth coils Ltb and Ltd were opposite to each other.

The coefficient of magnetic coupling between the power feeding coil unit and the power receiving coil was calculated using the inductance of the power feeding coil unit and the power receiving coil which was measured with an impedance analyzer. Specifically, the coupling coefficient was defined as the square root of the value determined by dividing the square of the mutual inductance of the power feeding coil unit and the power receiving coil by the self-inductance of the power feeding coil unit and the self-inductance of the power receiving coil.

The unwanted leakage magnetic field was determined using, as an index, the magnetic field strength at a position 10 m away from the center of the power feeding coil unit. A loop antenna was placed at a position 10 m away from the center of the power feeding coil unit in the axial direction of the power receiving coil to measure a magnetic field strength. Here, the loop antenna was used to measure the magnetic field strengths in three orthogonal directions (X, Y, and Z directions), and the magnetic field strengths were combined to calculate a leakage magnetic field strength. Note that the power feeding coil unit was placed at a height of 400 mm from the floor surface with a power transmitting surface thereof facing upward, and the power receiving coil was placed above the power feeding coil unit with an interval of 150 mm between them. In addition, the loop antenna was placed in such a manner that the center of the loop antenna was positioned at a height of 1.5 m from the floor of a radio-frequency (RF) anechoic chamber. In this case, the supply power of the power source PW was adjusted so that the power to be supplied to the load R became equal to 3 kW.

Figure 6:
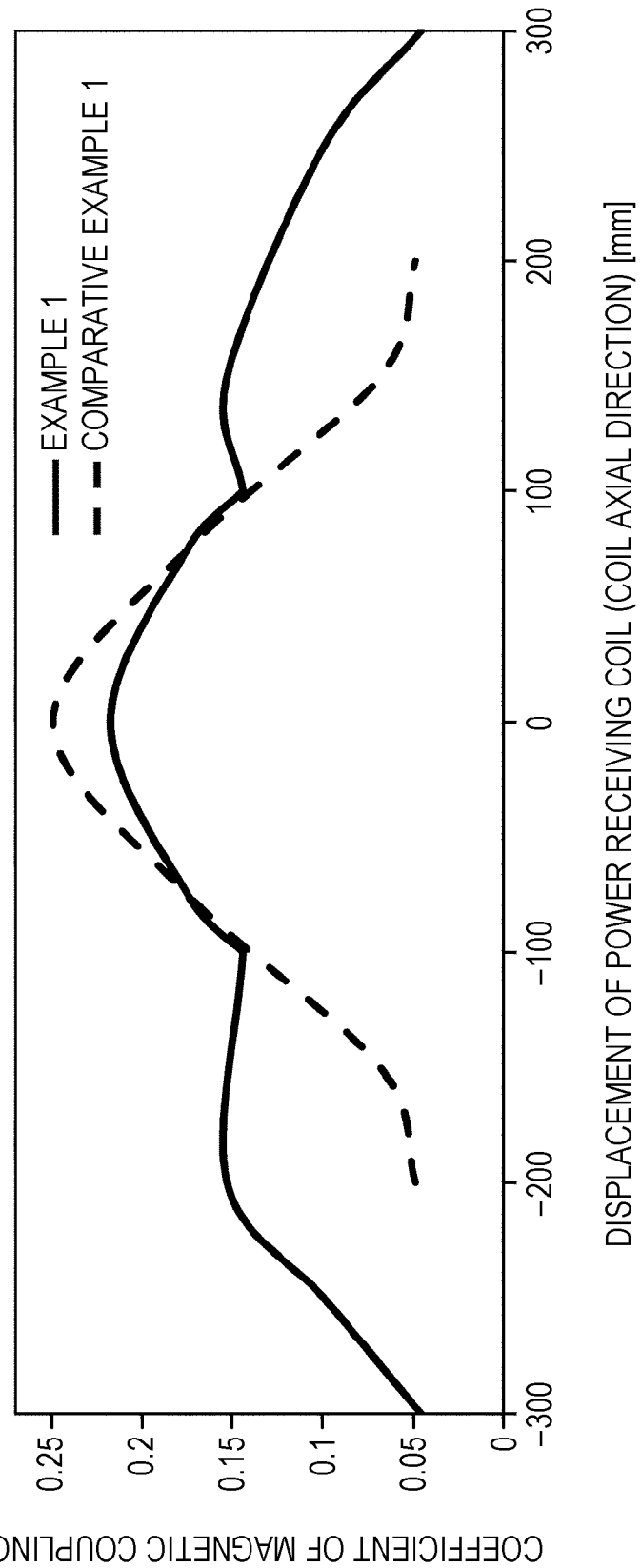
FIG. 6 depicts the results of measurement of the coupling coefficient in Example 1 and Comparative Example 1.

Measurement results of the coupling coefficient are shown in FIG. 6. As illustrated in FIG. 6, compared to Comparative Example 1, Example 1 exhibits a lower coupling coefficient at a displacement of 0 mm and a significantly higher coupling coefficient when the amount of displacement is in the range of ±100 mm to ±200 mm (both inclusive). That is, it has been found that, in a case where there is a displacement between the power feeding coil unit Ltu1 and the power receiving coil Lr in Example 1, a reduction in the magnetic coupling between the coils was prevented.

Figure 7:
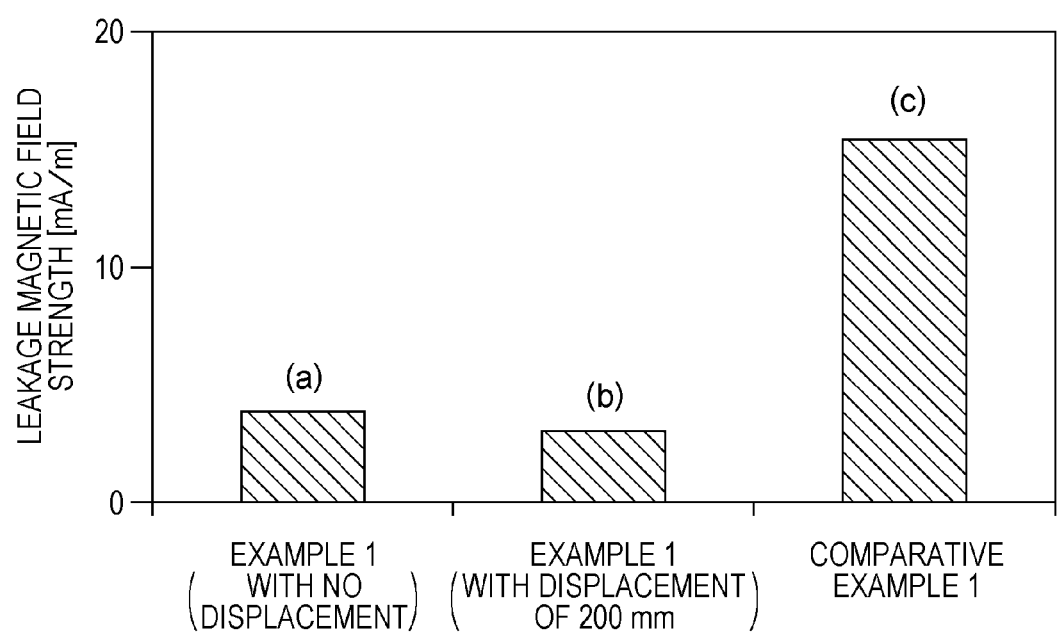
FIG. 7 depicts the results of the measurement of the leakage magnetic field strength in Example 1 and Comparative Example 1.

Measurement results of the leakage magnetic field strength are shown in FIG. 7. In FIG. 7, the plot (a) indicates the leakage magnetic field strength at a displacement of 0 mm in Example 1, the plot (b) indicates the leakage magnetic field strength at a displacement of 200 mm in Example 1, and the plot (c) indicates the leakage magnetic field strength at a displacement of 0 mm in Comparative Example 1. As illustrated in FIG. 7, the leakage magnetic field strength in Example 1 is significantly lower than that in Comparative Example 1 given in the plot (c), in either of the cases (a) and (b). That is, in Example 1, an unwanted leakage magnetic field formed in a location away from the power feeding coil unit Ltu1 was reduced. It has thus been found that the power feeding coil unit Ltu1 in Example 1 reduced an unwanted leakage magnetic field formed in a location away from the power feeding coil unit Ltu1 even in a case where there was a displacement between the power feeding coil unit Ltu1 and the power receiving coil Lr.

The present invention has been described with reference to an embodiment thereof. Such an embodiment is illustrative, and it is to be understood by a person skilled in the art that various modifications and changes can be made within the scope of the present invention and that such modifications and changes also fall within the scope of the present invention. Accordingly, the description given herein and the drawings taken in conjunction therewith are to be illustrative but not restrictive.

What is claimed is:
1. A coil unit for use in wireless power transmission from a power feeding side to a power receiving side, comprising:
   a first coil wound around a first axis;
   a second coil wound around a second axis, the first coil and the second coil being positioned side by side along an alignment direction, the first axis being parallel with the second axis, the first axis and the second axis being perpendicular to the alignment direction, the first axis and the second axis being distanced from each other in the alignment direction;
   a third coil located on a rear side of the first coil;
   a fourth coil located on a rear side of the second coil; and
   a drive control unit, wherein
   an axial direction of the third coil and an axial direction of the fourth coil are nonparallel to an axial direction of the first coil and an axial direction of the second coil, the third coil and the fourth coil are located so as to interpose a center of the first coil and a center of the second coil between the third coil and the fourth coil, in the alignment direction, and the drive control unit controls a direction or phase of a current flowing in each of the first coil, the second coil, the third coil, and the fourth coil.

2. The coil unit according to claim 1, wherein the axial direction of the third coil is substantially perpendicular to the axial direction of the first coil, and the axial direction of the fourth coil is substantially perpendicular to the axial direction of the second coil.

3. The coil unit according to claim 2, wherein each of the first coil, the second coil, the third coil, and the fourth coil includes a magnetic core, the magnetic core of the first coil is coupled to the magnetic core of the second coil, the magnetic core of the third coil is coupled to the magnetic core of the first coil, and the magnetic core of the fourth coil is coupled to the magnetic core of the second coil.

4. The coil unit according to claim 1, wherein each of the first coil, the second coil, the third coil, and the fourth coil includes a magnetic core, the magnetic core of the first coil is coupled to the magnetic core of the second coil, the magnetic core of the third coil is coupled to the magnetic core of the first coil, and the magnetic core of the fourth coil is coupled to the magnetic core of the second coil.

* * * * *